Patented July 29, 1952

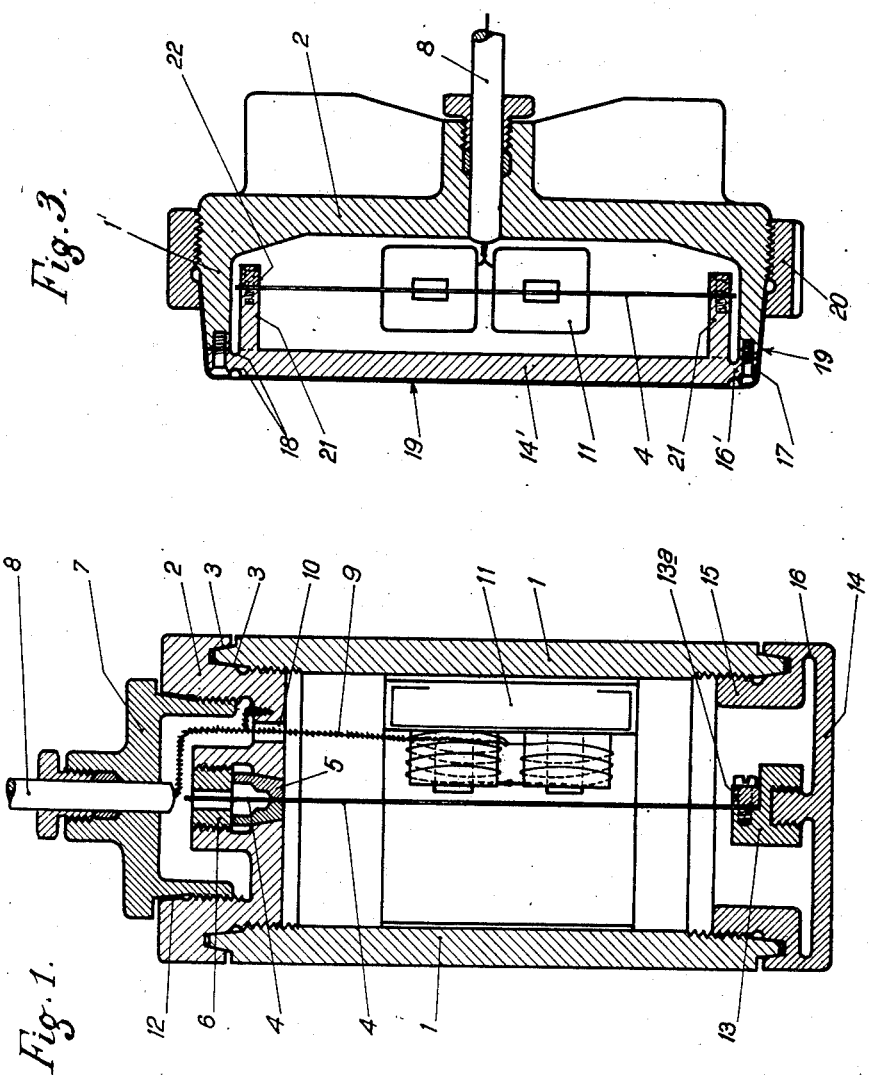

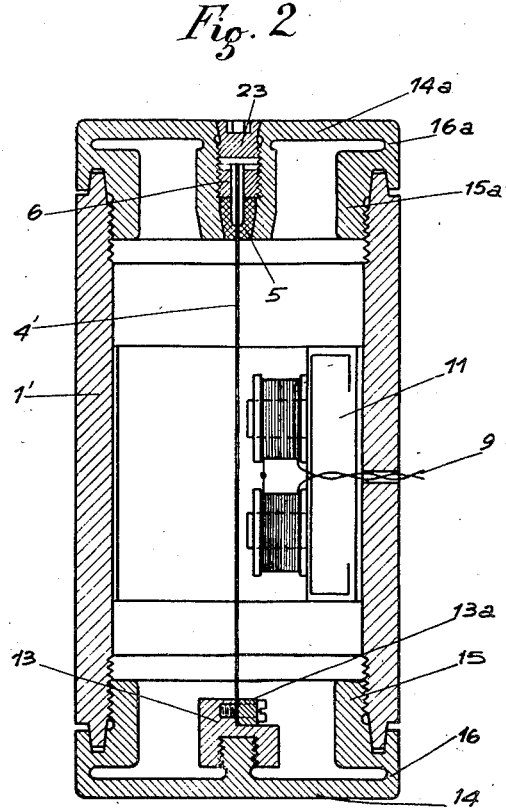

2,604,787

UNITED STATES PATENT OFFICE 2,604,787

ACOUSTIC MANOMETER

André Coyne, Jean Bellier, and Jean Marion, Paris, France

Application March 12, 1947, Serial No. 734,170 In France November 23, 1943

Section 1, Public Law 690, August 8, 1946 Patent expires November 23, 1963

7 Claims. (Cl. 73—398)

The present invention has for its object a manometer of the "acoustic" type, for estimating pressures according to the measurement of the variations of frequency, or of the variations of length, of a vibrating string arranged in a case which is influenced by the pressure to be measured, said variations being estimated acoustically by tuning in unison with said string the string of a frequency-meter, in the known manner, first in the position of rest, and then with the pressure to be measured acting upon the case which encloses and supports said string.

The manometer according to the invention is chiefly characterised by the fact that the vibrating string is connected to an elastic wall of determined size, having a very small proper deformability and adapted to be submitted to the action of the pressure to be measured, said elastic wall being secured by an elastic attachment, which is devoid of play and friction, to an indeformable case body, so that the angular deformations occurring at the circumference of said wall take place without friction, and that, said wall being acoustically bound to the mass of said case body, the proper vibrations of said wall cannot interfere with the vibrations of said string.

According to an embodiment of the invention, the said wall is constituted by a disk which is connected, by a concentric underlying or surrounding portion of determined reduced thickness, to an indeformable ring-shaped base which is rigidly secured to the case body.

In the manometer according to the invention, the vibrating string may be mounted in two different manners, according to whether the variations of length of said string under the action of the pressure to be measured are to be controlled by the perpendicular deformations of the center of said disk, that is to say by its sag, or by the angular deformations of the circumference of said disk.

In the first instance, the string is placed axially in the case, one end of said string being secured to the above mentioned elastic wall, and the other end of said string being secured to an indeformable bottom which is rigidly mounted on the rigid tubular body of the case, or to a second elastic wall similar to said first mentioned elastic wall.

In the second instance, the string is tensioned between two diametrally opposed arms or extensions formed on the inner side of the elastic wall.

The acoustic manometer according to the invention has the advantages of being simple in construction, sturdy and not liable to vary in its regulation; it can be employed with a maximum of convenience in any place, for example for measuring the pressure of a gas, of a liquid or of a pulverulent substance, on a wall or in a closed space; for measuring densities, the depth of terrestrial, marine or aerial soundings; for measuring the internal pressures in dams, the piezometric load in the ground, and generally for measuring any value which can be derived from the measurement of a pressure.

The accompanying drawing shows by way of example two embodiments of the manometer according to the invention.

Fig. 1 is a longitudinal section of a first embodiment.

Fig. 2 is a longitudinal section of a modification of the first embodiment.

Fig. 3 is a diametral section of a second embodiment.

In the embodiment shown on Fig. 1, 1 is the tubular body of the case which is designed so as to be able to support strictly without deformation, or with elastic deformation the strain of pressures comprised within a determined range, for the measurement of which the device is intended to be used.

At one of its ends, the case body 1 carries a bottom 2 which is also indeformable and is mounted preferably by screwing, so as to ensure tightness by the wedging of a double conical joint 3. In a central aperture of said bottom is secured one of the ends of the vibrating string 4, preferably by clasping it between two jaws 5 wedged into a conical bore by the pressure of a screw 6. The string 4 is made of magnetic material, for example of steel.

The bottom 2 carries a cover through the center of which passes tightly a cable 8 for the electric connections of the device. The conductors 9 of said cable pass through an opening 10 formed in said bottom 2 and lead to the coils of an electro-magnet 11 adapted to keep up the vibration of the string, in the known manner, said electro-magnet being mounted in the case body 1 in any convenient manner.

The cover 7 is also mounted so as to ensure tightness, for example by screwing, a metalloplastic packing 12 being compressed between two conical surfaces.

The string 4, which is in this instance placed axially in the case, is clasped at its other end in a support constituted by two members 13 and 13a and mounted by screwing upon the end wall 14 of the case. Alternatively, said other end of the string may also be clasped in a support similar to the jaws 5 and also screwed upon the end wall 14.

The wall 14 is made of steel and constituted by a disk the thickness of which is determined in relation with its diameter so that its proper deformability is very small. The said disk is integral with a tubular extension 15 which is connected to the case body 1 by a double conical joint, as described above with respect to the mounting of the bottom 2. Said disk 14 is connected to said tubular extension 15 by an underlying metal ring portion 16 which may have its thickness locally reduced so as to constitute a kind of elastic articulation which increases the flexibility of the end wall 14, so that the latter will be able to undergo elastic deformations under the action of the pressures to be measured. This mode of connection binds the wall 14 to the case body 1 from the acoustic point of view, so as to constitute a unit having a proper frequency which is very different of the frequency of the string and the vibrations of which are absorbed by the said articulation.

Therefore, when vibration of the string 4 is caused by any convenient means, for example by an electric current of short duration passed through the electro-magnet 11, the listening to the sound vibrations of said string will not be disturbed by the vibrations of the wall 14, and it will be possible to measure the pressure acting upon said wall with all the desired precision.

In a modified embodiment, the rigid bottom 2 may be replaced by a second elastic end wall similar to the above described end wall 14 and mounted in a similar manner upon the case body 1.

In such a modification, as shown by Fig. 2, the upper end of the case body 1 is closed by an upper end wall 14a, 15a, 16a which is similar to the lower end wall 14, 15, 16, except that said upper end wall is formed at its center with a tapped hole receiving the jaws 5 and screw 6 for clasping the upper end of the string 4. A plug 23 closes said hole tightly.

In the embodiment shown on Fig. 3, the case body 1' is integral with the indeformable bottom 2 through which passes directly the cable 8 with the electric connections of the device.

In this embodiment, the elastic wall 14' is concentrically surrounded by an annular portion 16' which has a reduced thickness and is in its turn surrounded by a rim 17. The latter is rigidly secured to the case body 1' and does not participate in the deformations of the wall 14'. The wall 14' and the rim 17 may have the same thickness, in which case the annular portion 16' may be formed by two symmetrical grooves 18 made in both surfaces of the piece. In order to ensure perfect tightness, it will be convenient to provide the device with a cap 19 of red copper-sheet the edge of which is clasped between the case body 1' and a nut 20.

In this embodiment, the wall 14' is formed on its inner side with two diametrally opposed extensions 21 between which the string 4 is tensioned by means of small screw caps 22, so that the string 4 is placed perpendicularly with respect to the axis of the case, the angular deformations of the circumference of the wall 14' produced by the pressure acting thereon being amplified by the extensions 21 and transmitted to the string 4 in order to be measured.

The measuring of a pressure with a manometer according to any of the above described embodiments may be performed as follows:

The manometer being at rest, that is to say, not submitted to pressure, the string 4 is first caused to vibrate (or is "pinched") by a sudden electric discharge, such as that of a condenser, led by the conductors 9 through the coils of the electro-magnet 11. The conductors 9 are then disconnected from the condenser and connected to a listening device and the vibration frequency of the string of a frequency meter is tuned in with the acoustic vibration frequency of the string 4. The tuning in of the frequency meter is effected, as well known in the art, by varying the length and consequently the tension of its string by means of a micrometer screw.

The above operations are then repeated while the manometer is submitted to the pressure to be measured. The variation of length of the string 4 caused by the pressure acting on the manometer can be calculated according to the following equations, in which:

$n$, $t$, $l$ and $dl$ are respectively the frequency of vibration, the tension, the length and the variation of length of the string 4;

$N$, $T$, $L$ and $dL$ are respectively the frequency of vibration, the tension, the length and the variation of length of the string of the frequency meter;

$K$ is a constant; and $E$ is the modulus of elasticity of the strings.

As well known:

$$n = K \frac{\sqrt{t}}{l}$$

and $$N = K \frac{\sqrt{T}}{L}$$

The string of the frequency meter being tuned in with the string 4, there results:

$$n = N$$

and $$\frac{\sqrt{t}}{\sqrt{T}} = \frac{l}{L}$$

On the other hand, as well known:

$$t = E \frac{dl}{l}$$

and $$T = E \frac{dL}{L}$$

so that:

$$\frac{dl}{l} = \left(\frac{l}{L}\right)^2 \frac{dL}{L}$$

$dL$ being indicated by the micrometer screw of the frequency meter, this last formula makes it possible to calculate $$\frac{dl}{l}$$

and consequently the pressure acting upon the manometric case.

The measures can be simplified by gauging the manometer, that is to say, by determining in advance the pressure corresponding to every setting of the micrometer screw of the frequency meter.

It will be understood that the embodiments which have been described above with reference to the accompanying drawing are given by way of example only, and that constructional modifica-

We claim:

1. A manometer for measuring pressures by measuring the variations of frequency of a vibrating string connected to a pressure-responsive wall, comprising a non-deformable sealed hollow body having at least one pressure-resisting elastic wall of small deformability, an elastic articulating member connecting said wall and said body, a string under tension arranged in said body and having at least one of its ends connected to said wall, and means for causing said string to vibrate.

2. A manometer for measuring pressures by measuring the variations of frequency of a vibrating string connected to a pressure-responsive wall, comprising a non-deformable hollow body having at least one open end, a pressure-resisting elastic wall sealing said open end and including an elastic disk of small deformability, a rigid portion rigidly connected to said body and a thin annular portion connecting said disk to said rigid portion, a string under tension arranged in said body and having at least one end connected to said disk, and means for causing said string to vibrate.

3. A manometer for measuring pressures by measuring the variations of frequency of a vibrating string connected to a pressure-responsive wall, comprising a tubular non-deformable body having open ends, a non-deformable member and a pressure-resisting elastic wall arranged respectively to close said open ends of said body, said elastic wall including an elastic disc of small deformability and a rigid rim screwed into said open end of said body at which said elastic wall is arranged and a thin annular portion connecting said disk to said rim, a string under tension of magnetic material arranged axially in said body and having its ends connected, respectively, to said non-deformable member and to said elastic disk, and an electromagnet arranged in said body and having poles facing said string.

4. A manometer for measuring pressures by measuring the variations of frequency of a vibrating string connected to a pressure-responsive wall, comprising a tubular non-deformable body having open ends, a pressure-resisting elastic wall sealing each of said open ends, each of said elastic walls including an elastic disk of small deformability, a rigid rim screwed in the respective open end of said body and a thin annular portion connecting said disk to said rim, a string under tension of magnetic material arranged axially in said body and having its ends connected, respectively, to said disks, and an electromagnet arranged in said body and having poles facing said string.

5. A manometer for measuring pressures by measuring the variations of frequency of a vibrating string connected to a pressure-responsive wall, comprising a non-deformable hollow body having an open end, a pressure-resisting elastic wall sealing said open end and including an elastic disk of small deformability, a rigid peripheral rim rigidly connected to said open end of said body and a thin annular portion connecting said disk to said rim, two diametrally opposed extensions projecting from said disk into the interior of said body and arranged near the periphery of said disk, a string of magnetic material mounted in said body and tensioned transversely with respect to the axis of said body, said string having its ends connected respectively to said extensions, and an electromagnet arranged in said body and having poles facing said string.

6. A manometer for measuring pressures by measuring the variations of frequency of a vibrating string connected to a pressure-responsive wall comprising a casing having an opening, means sealing said opening comprising an elastic disk of small deformability, a rigid peripheral rim connected to the opening of said casing and a thin annular portion connecting said disk to said rim, and attachment means at the center of the inner side of each said disk for attaching one end of said string.

7. A manometer for measuring pressure by measuring the variations of frequency of a vibrating string connected to a pressure-responsive wall comprising a casing having an opening, means sealing said opening comprising an elastic disk of small deformability, a rigid peripheral rim connected to the opening of said casing and a thin annular portion connecting said disk to said rim, Two diametrally opposed extensions projecting from the inner side of said disk and arranged near the periphery of said disk, and attachment means on said extensions for attaching the ends of said string.

ANDRÉ COYNE.
JEAN BELLIER.
JEAN MARION.

REFERENCES CITED

The following references are of record in the file of this patent:

UNITED STATES PATENTS

| Number | Name | Date |
|---|---|---|
| 556,702 | Snow | Mar. 17, 1896 |
| 633,471 | McGarvey | Sept. 19, 1899 |
| 1,995,305 | Hayes | Mar. 26, 1935 |
| 2,050,674 | Stover | Aug. 11, 1936 |
| 2,269,760 | Eldredge | Jan. 13, 1942 |
| 2,306,137 | Pabst et al. | Dec. 22, 1942 |
| 2,307,066 | Paulus | Jan. 5, 1943 |
| 2,447,817 | Rieber | Aug. 24, 1948 |
| 2,455,021 | Rieber | Nov. 30, 1948 |

FOREIGN PATENTS

| Number | Country | Date |
|---|---|---|
| 83,392 | Sweden | May 14, 1935 |